(No Model.) 2 Sheets—Sheet 1.

J. R. FINNEY.
SECONDARY BATTERY.

No. 267,860. Patented Nov. 21, 1882.

Witnesses
Jno. K. Smith.
L. C. Fitler

Inventor
Joseph R. Finney
by his attys
Bakewell & Kerr (No Model.)  J. R. FINNEY.  2 Sheets—Sheet 2.

SECONDARY BATTERY.

No. 267,860.  Patented Nov. 21, 1882.

Witnesses
Jno. K. Smith
L. C. Fibler

Inventor
Joseph R. Finney
by his attys
Bakewell & Kerr

UNITED STATES PATENT OFFICE.

JOSEPH R. FINNEY, OF PITTSBURG, PENNSYLVANIA.

SECONDARY BATTERY.

SPECIFICATION forming part of Letters Patent No. 267,860, dated November 21, 1882.

Application filed June 12, 1882. (No model.)

*To all whom it may concern:*

Be it known that I, JOSEPH R. FINNEY, of Pittsburg, in the county of Allegheny and State of Pennsylvania, have invented a new and useful Improvement in Secondary Batteries; and I do hereby declare the following to be a full, clear, and exact description thereof, reference being had to the accompanying drawings, forming a part of this specification, in which—

Figure 1:
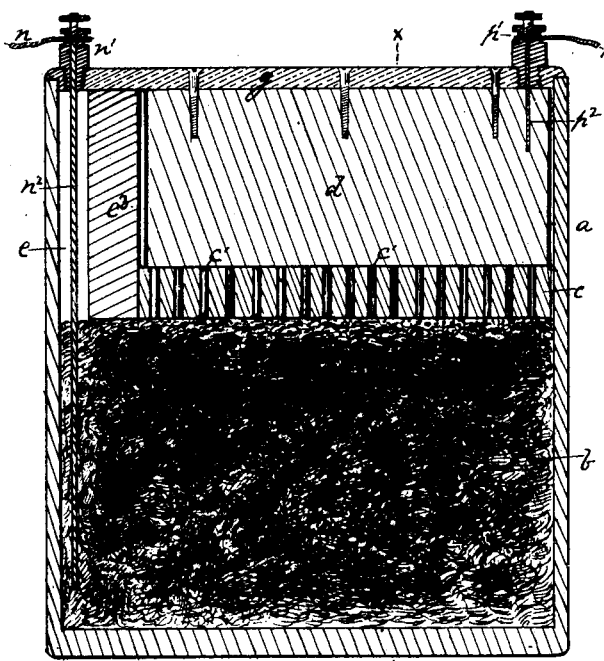
Figure 2:
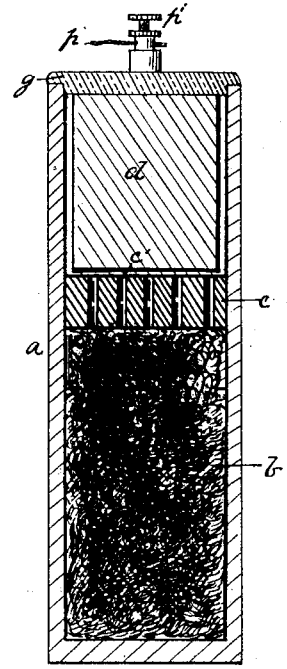
Figure 3:
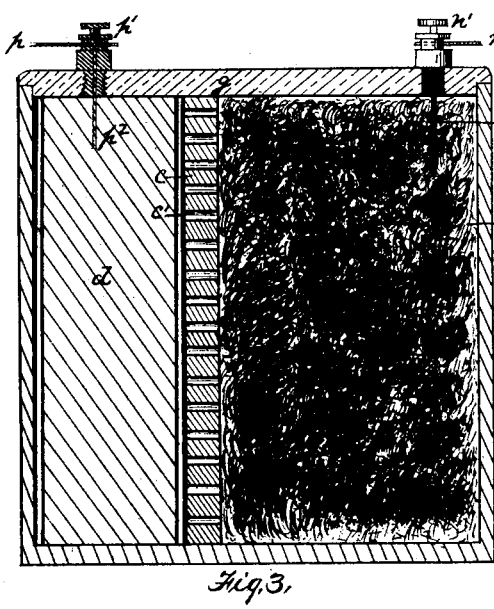
Figure 4:
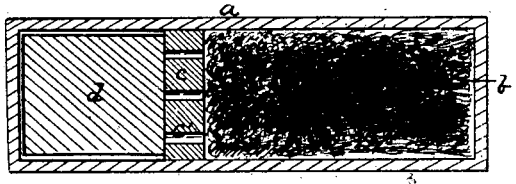
Figure 5:
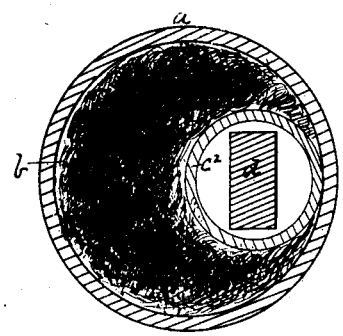
Figure 6:
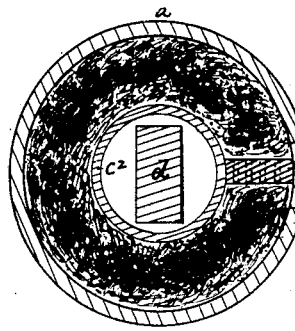
Figure 7:
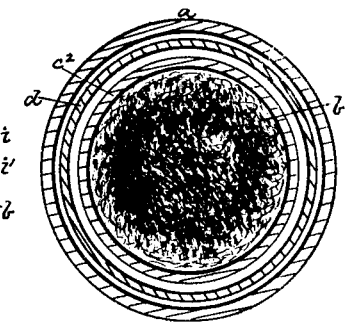
Figure 8:
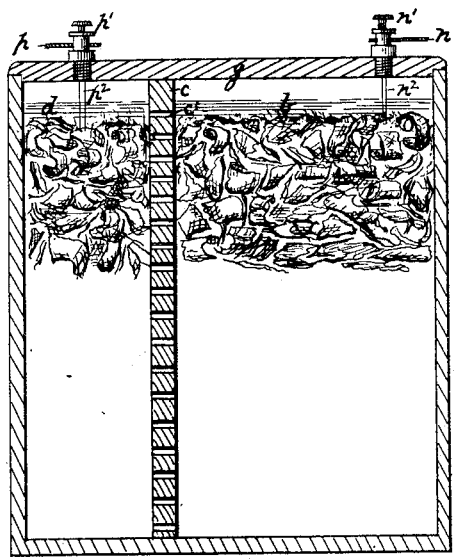
Figure 9:
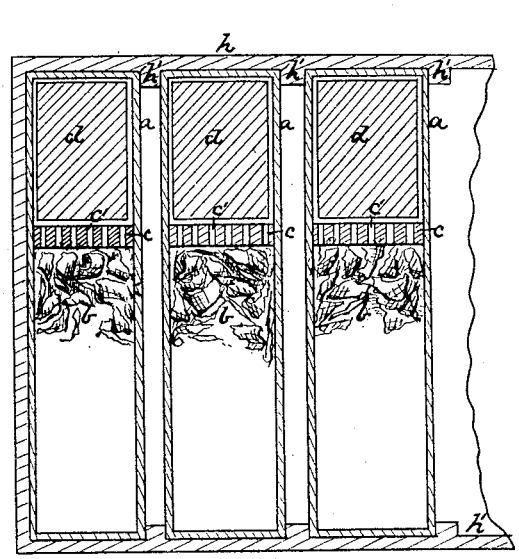
Figure 10:
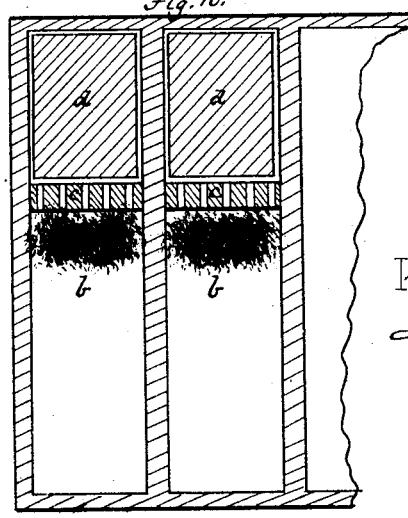

Figure 1 is a vertical longitudinal section of my improved battery or cell. Fig. 2 is a vertical section of the same on the line $xx$ of Fig. 1. Figs. 3 and 4 are like views of other forms. Figs. 5, 6, and 7 are views of other forms of cells. Fig. 8 is a view of a cell in which both of the electrodes are made of flocculent lead. Figs. 9 and 10 are plan views of boxes for containing a battery of cells.

Like letters of reference indicate like parts in each.

The cell $a$ is made of glass, porcelain, vulcanized rubber, earthenware, or other suitable material which is not affected by the action of the acid or of the current therein. In Figs. 1, 2, 3, and 4 the cell is of a flat rectangular shape, and in Figs. 5, 6, and 7 it is cylindrical. For the negative electrode I make use of fibrous, flaky, or flocculent lead, prepared by pouring molten lead into water or by blowing air through a falling stream of the same, or thin shavings, which may be produced by planing lead bars. The essential requisites of the material are that it shall be light and present an extended surface, and of such a nature that when packed in the cell it shall form a porous permeable mass, to every part of which the exciting-fluid can readily obtain access. This thin lead is either rammed down into its compartment in the cell, or it is compressed into plates or tablets by means of suitable dies, and such plates or tablets are inserted into the cell. In Figs. 1 and 2 I show the lead placed at the bottom of the cell, as at $b$. Above it I place a partition, $c$, made of wood, earthenware, or other suitable material, which is full of small holes or perforations $c'$, so as to permit a free circulation of the acid through it. The other electrode, $d$, is composed of a plate or bar of carbon, and is attached to a wooden or other non-conducting cap or cover, $g$, by means of which it is rested upon the mouth of the vessel $a$, so that the cap serves the double purpose of supporting the carbon and of closing the mouth of the cell. The carbon $d$ is shorter than the cell, and the partition $c$ is continued up its side, as at $c^3$, so as to provide a narrow space, $e$, separated from the carbon, for running the conductor $n^2$ down to the lead $b$. Contact-screws $p'$ and $n'$ are provided for the attachment of the wires $p$ and $n$ in electrical connection with conductors $n^2$ and $p^2$, which extend down to the electrodes. The cell is filled with acidulated water, and then the cap $d'$ is put in place and the wires connected. The cell may be used either as a primary battery or as a secondary battery. The structure of the electrode $b$ is open and an enormous surface is exposed to the acidulated water. The lead, however, is not reduced rapidly, and produces a very constant current of electricity. When used as a secondary battery it is charged in the usual way. In taking off the current for utilization the wires are connected in the usual way. Practical experience has demonstrated the storage capacity of the cell to be very great.

In Figs. 3 and 4 the partition $c$ is placed in a vertical position, with the lead $b$ on one side and the carbon $d$ on the other. Here the cap $g$ is separate from the carbon.

The electrode $d$ may be formed of platinum or other suitable metal, instead of the carbon. The top or cap $g$ need not be used unless desired; but I prefer it, as it enables me to close the cell and to handle it without the danger of spilling or splashing out the acidulated water. The form of cell shown in Figs. 1 to 4 is convenient in making up a battery, because any desired number of them may be placed in a box or case, $h$, side by side, and, if desired, the case may have grooves $h'$ in its sides, into which the cells may be slid, as in Fig. 9. In either case single cells may be drawn out or slid in without disturbing the others. The box or case mentioned may be formed of glass, porcelain, porcelain-lined metal, earthenware, or other suitable material, and may be provided with lateral partitions which divide it into compartments, as in Fig. 10, instead of having separate cells. In these compartments the electrodes, the perforated medium, and acidulated water are placed. The battery composed of these cells may be charged and the charge be taken off for quantity or intensity in the manner usually practiced for that purpose.

In Fig. 5 the cell $a$ is round, and the partition is a porous or perforated jar or tube, $c^2$, and contains the electrode $d$. The lead $b$ is placed in the cell $a$ outside of the tube $c^2$.

In Fig. 6 the perforated or porous jar $c^2$ is placed centrally in the cell and the metallic contact of the lead in the annular chamber $i$ is broken by a partition, $i'$, which serves the purpose of the slit in the ordinary zinc electrode.

In Fig. 7 the carbon electrode $d$ is placed in the annular chamber $i$ and the flocculent lead in the perforated jar $c^2$.

In Fig. 8 I show a cell in which both of the electrodes are formed of the lead. This cell is more especially designed for use as a secondary battery.

A great advantage of my invention is that I obtain, by the use of the lead of the character described, a greatly-increased surface with a given weight. My construction is so cheap, simple, and effective as to render these batteries economically useful, and fit them to be intrusted to the care of persons of ordinary intelligence and unskilled in the manufacture and use of batteries. The purpose of the porous medium between the electrodes is to separate the same and prevent short-circuiting, while at the same time the exciting-fluid has free access to both electrodes. It is therefore evident that cotton, felt, or like material may be employed, if desired.

Of the other electrodes named I prefer the carbon, as it is cheap and practically indestructible, and hence does not require to be renewed.

I am aware that the use of lead in the form of a coarse powder has been suggested for an electrode, and do not herein claim the same, for the reason that it differs from my invention, first, in that the powder is liable to become compacted and prevent the circulation and access of the exciting-fluid; and, secondly, in that the powder, in shifting or settling, and by the electrolytic action, is liable to complete the circuit in the cell, and thus destroy the working of the battery.

What I claim as my invention, and desire to secure by Letters Patent, is—

A cell having an electrode or electrodes of leafy, flaky, or fibrous lead, substantially as and for the purposes described.

In testimony whereof I have hereunto set my hand this 8th day of June, A. D. 1882.

JOSEPH R. FINNEY.

Witnesses:
T. B. KERR,
L. C. FITLER.